US010044874B2

(12) United States Patent
Li et al.

(10) Patent No.: US 10,044,874 B2
(45) Date of Patent: Aug. 7, 2018

(54) TELEPHONE NUMBER BASED INFORMATION LOADING METHOD AND DEVICE

(71) Applicant: BEIJING QIHOO TECHNOLOGY COMPANY LIMITED, Beijing (CN)

(72) Inventors: Bin Li, Beijing (CN); Yanbei Jiang, Beijing (CN); Shaoqing Tan, Beijing (CN)

(73) Assignee: Beijing Qihoo Technology Limited, Beijing (CN)

( * ) Notice: Subject to any disclaimer, the term of this patent is extended or adjusted under 35 U.S.C. 154(b) by 0 days.

(21) Appl. No.: 15/540,991

(22) PCT Filed: Nov. 3, 2015

(86) PCT No.: PCT/CN2015/093721
§ 371 (c)(1),
(2) Date: Jun. 29, 2017

(87) PCT Pub. No.: WO2016/107277
PCT Pub. Date: Jul. 7, 2016

(65) Prior Publication Data
US 2017/0346952 A1    Nov. 30, 2017

(30) Foreign Application Priority Data

Dec. 29, 2014  (CN) .......................... 2014 1 0849687

(51) Int. Cl.
*H04M 7/00*       (2006.01)
*H04M 1/725*      (2006.01)
(Continued)

(52) U.S. Cl.
CPC ......... *H04M 7/003* (2013.01); *H04M 1/2745* (2013.01); *H04M 1/72561* (2013.01); *H04W 80/12* (2013.01)

(58) Field of Classification Search
CPC ............... H04M 7/003; H04M 1/2745; H04M 1/72561; H04M 1/72552; H04M 1/27455;
(Continued)

(56) References Cited

U.S. PATENT DOCUMENTS 6,834,048 B1    12/2004   Cho et al.
2008/0267377 A1*  10/2008  Siegrist ................. H04M 7/003
379/201.02

(Continued)

FOREIGN PATENT DOCUMENTS

CN     101304413 A    11/2008
CN     101304576 A    11/2008
(Continued)

OTHER PUBLICATIONS

International Patent Application No. PCT/CN2015/093721; Int'l Written Opinion and Search Report; dated Jan. 25, 2016; 21 pages.

*Primary Examiner* — Thanh Le
(74) *Attorney, Agent, or Firm* — Baker & Hostetler LLP

(57) ABSTRACT

Disclosed are a telephone-number-based information loading method and device, wherein the method comprises steps of: detecting a telephone number in current display contents on a terminal side; determining whether the telephone number carries a feature identifier; and if yes, then generating a dial option control that is based on the telephone number in the current display contents, and/or invoking entry information of a webpage type service previously associated with the telephone number. According to the present invention, it is possible to conserve bandwidth resources, while preventing the occurrence of a situation in which a user mistakenly enters a dangerous website because of a search error, resulting in a security threat or other losses.

15 Claims, 3 Drawing Sheets

(51) Int. Cl.
*H04M 1/2745* (2006.01)
*H04W 80/12* (2009.01)

(58) Field of Classification Search
CPC ......... G06F 17/30861; G06F 17/30899; G10L 15/30
See application file for complete search history.

(56) References Cited

U.S. PATENT DOCUMENTS

2008/0282164 A1* 11/2008 Blass ................ H04M 1/72561
715/719
2010/0088100 A1* 4/2010 Lindahl ................... G10L 15/30
704/270.1
2012/0079395 A1* 3/2012 Bengualid ......... G06F 17/30899
715/745

FOREIGN PATENT DOCUMENTS

| CN | 101621559 A | 1/2010 |
| CN | 103516868 A | 1/2014 |
| CN | 104023141 A | 9/2014 |
| CN | 104580639 A | 4/2015 |

* cited by examiner

TELEPHONE NUMBER BASED INFORMATION LOADING METHOD AND DEVICE

CROSS-REFERENCE TO RELATED APPLICATIONS

This application is the national stage of International Application No. PCT/CN2015/093721 filed Nov. 3, 2015, which claims the benefit of Chinese Patent Applications No. CN201410849687.6, filed Dec. 29, 2014, the entirety of which are incorporated herein by reference.

FIELD OF TECHNOLOGY

The present invention relates to the technical field of address book, and particularly to a telephone number based information loading method and a telephone number based information loading device.

BACKGROUND

With the development of Internet technology, Internet promotion has become an important means of business marketing. Promotion information released by an enterprise on the Internet may usually contain a contact telephone number of the enterprise. When a user has a need to obtain a service provided by the enterprise corresponding to a telephone number displaying on a current web page, the user may dial the telephone number or search for the online service corresponding to the telephone number.

Generally speaking, if the user selects to obtain the corresponding service by dialing the telephone number, the user often necessarily inputs the telephone number manually. Since digits of the telephone number are much long, the user may easily input a wrong telephone number and input again. This may partly bring inconvenience to the user.

On the other hand, if the user has a need to obtain the online service corresponding to a telephone number, the user is required to search for the telephone number to obtain the online service page entry corresponding to the telephone number. The search process consumes bandwidth resource. If the accidentally visits a dangerous web site during the search process, it is also possible to cause security threats and other losses of the user equipment.

SUMMARY

In view of the above problems, the present invention has been made to provide a telephone number based information loading method and a corresponding telephone number based information loading device which overcome the above-mentioned problems or at least partially solve or alleviates the above-mentioned problems.

According to an aspect of the present invention, there is provided a telephone number based information loading method, which comprises steps of:
  detecting a telephone number in current display contents on a terminal side;
  determining whether the telephone number carries a feature identifier; and
  if yes, then generating a dial option control that is based on the telephone number in the current display contents, and/or invoking entry information of a webpage type service previously associated with the telephone number.

Optionally, the method further comprises:
  dialing the telephone number when detecting a trigger operation of a user on the dial option control.
Optionally, the method further comprises:
  displaying a service page corresponding to the entry information of the webpage type service, when detecting that the dialing of the telephone number fails.
Optionally, the method further comprises:
  displaying a service page corresponding to the entry information of the webpage type service, when detecting the trigger operation of the user on the telephone number.
Optionally, the feature identifier is a promotional identifier for a merchant.
Optionally, the current display contents include at least one of contents of a page opened by a browser and a current session interface.
Optionally, the step of determining whether the telephone number carries a feature identifier comprises:
  matching the telephone number in local database where one or more telephone numbers carrying feature identifier are stored; and
  if the matching is successful, then determining that the telephone number carries the feature identifier.
Optionally, the step of determining whether the telephone number carries a feature identifier further comprises:
  if no telephone number in the local database that matches with the telephone number exists, generating a query request in accordance with the telephone number; and
  sending the query request to a server, and receiving a response message returned from the server representing that the telephone number carries the feature identifier, wherein the response message is generated when the server searches the database on a server side for the telephone number in accordance with the query request and when the telephone number is found.

According to another aspect of the present invention, there is provided a telephone number based information loading device, which comprises:
  a telephone number detection module, configured to detect a telephone number in current display contents on a terminal side;
  a determining module, configured to determine whether the telephone number carries a feature identifier;
  a control generation module, configured to, if it is determined that the telephone number carries the feature identifier, then generate a dial option control that is based on the telephone number in the current display contents; and
  a page invocation module, configured to, if it is determined that the telephone number carries the feature identifier, then invoke entry information of a webpage type service previously associated with the telephone number.

Optionally, the device further comprises:
a telephone number dial module, configured to dial the telephone number when detecting a trigger operation of a user on the dial option control.
Optionally, the device further comprises:
a page opening module, configured display a service page corresponding to the entry information of the webpage type service when detecting that the dialing of the telephone number fails.
Optionally, the device further comprises:
a page display module, configured to display a service page corresponding to the entry information of the webpage type service when detecting the trigger operation of the user on the telephone number.

Optionally, the feature identifier is a promotional identifier for a merchant.

Optionally, the current display contents include at least one of contents of a page opened by a browser and a current session interface.

Optionally, the determining module is further configured to:
match the telephone number in local database where one or more telephone numbers carrying the feature identifiers are stored; and
if the matching is successful, then determine that the telephone number carries the feature identifier.

Optionally, the determining module is further configured to:
if no telephone number in the local database that matches with the telephone number exists, then generate a query request in accordance with the telephone number; and
send the query request to a server, and receive a response message returned from the server representing that the telephone number carries the feature identifier, wherein the response message is generated when the server searches the database on a server side for the telephone number in accordance with the query request and when the telephone number is found.

According to still another aspect of the present invention, there is provided computer program, comprising computer readable codes, wherein the telephone number based information loading method as set forth is executed by a computing device when the computer readable codes are carried out on the computing device.

According to still yet another aspect of the present invention, there is provided a computer readable medium, in which the computer program as set forth is stored.

Beneficial effects of the present invention:
in the embodiment of the present invention, if it is determined that a telephone number carries a feature identifier after detecting the telephone number in current display contents on a terminal side, then a dial option control based on the telephone number can be generated in the current display contents, and/or entry information of a webpage type service previously associated with the telephone number can be invoked. A user could dial the telephone number simply by triggering the dial option control without manually inputting the telephone number, such that user's operations can be simplified.

Further, since the telephone number has the associated entry information of the webpage type service, if the user obtains an exact entry of the webpage type service corresponding to a telephone number simply by clicking the telephone number, then the user will not be necessarily search the network for the telephone number to obtain the related entry information, thereby conserving bandwidth resources while preventing the occurrence of a situation in which a user mistakenly enters a dangerous website due to a search error, resulting in security threats or other losses.

In addition, if the dialing of the telephone number by triggering the dial option control by the user fails, it is possible to display the service page corresponding to the entry information of the webpage type service associated with the telephone number so that the user can achieve the same purpose of dialing the phone number by selecting services online, providing user-friendly operations and improvement of the user experience.

Described above is merely an overview of the inventive scheme. In order to more apparently understand the technical means of the present invention to implement in accordance with the contents of specification, and to more readily understand above and other objectives, features and advantages of the present invention, specific embodiments of the present invention will be provided hereinafter.

BRIEF DESCRIPTION OF THE DRAWINGS

Various other advantages and benefits will become apparent to those having ordinary skill in the art upon reading the following detailed description of the preferred embodiments. The accompanying figures are provided for the purpose of illustrating preferred embodiments only and should not be construed as limiting the present invention. Throughout the figures, the same reference numerals are used to designate the same members. In the drawings.

DESCRIPTION OF THE EMBODIMENTS

Exemplary embodiments of the present invention will be described in detail with reference to the accompanying figures hereinafter.

Figure 1:
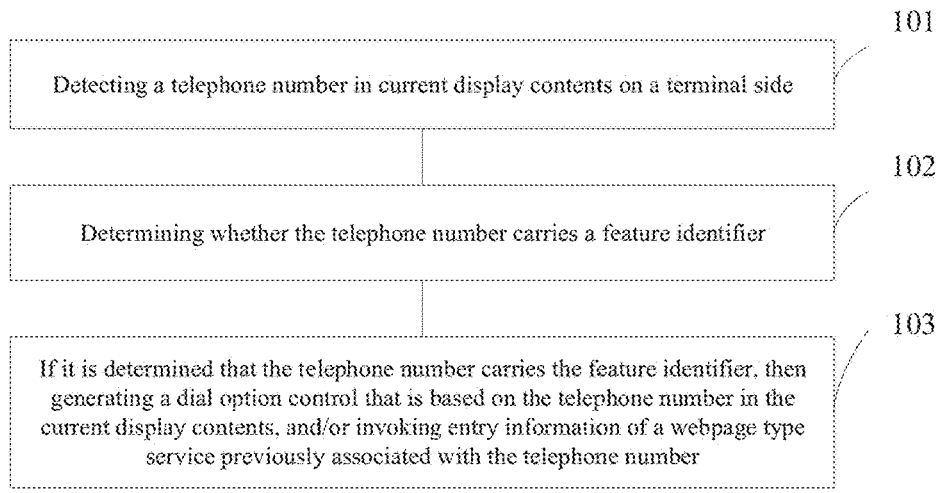
FIG. 1 schematically illustrates a process flow chart of a first example of a telephone number based information loading method according to one embodiment of the present invention.

With reference to FIG. 1, it shows a process flow chart of a first example of a telephone number based information loading method according to one embodiment of the present invention, particularly comprising steps of:
Step 101, detecting a telephone number in current display contents on a terminal side;
Step 102, determining whether the telephone number carries a feature identifier; and
Step 103, if it is determined that the telephone number carries the feature identifier, then generating a dial option control that is based on the telephone number in the current display contents, and/or invoking entry information of a webpage type service previously associated with the telephone number.

In the embodiment of the present invention, if it is determined that a telephone number carries a feature identifier after detecting the telephone number in current display contents on a terminal side, then a dial option control based on the telephone number can be generated in the current display contents, and/or entry information of a webpage type service previously associated with the telephone number can be invoked. A user could dial the telephone number simply by triggering the dial option control without manually inputting the telephone number, such that user's operations can be simplified.

Further, since the telephone number has the associated entry information of the webpage type service, if the user obtains an exact entry of the webpage type service corresponding to a telephone number simply by clicking the telephone number, then the user will not be necessarily search the network for the telephone number to obtain the related entry information, thereby conserving bandwidth resources while preventing the occurrence of a situation in which a user mistakenly enters a dangerous website due to a search error, resulting in security threats or other losses.

Figure 2:
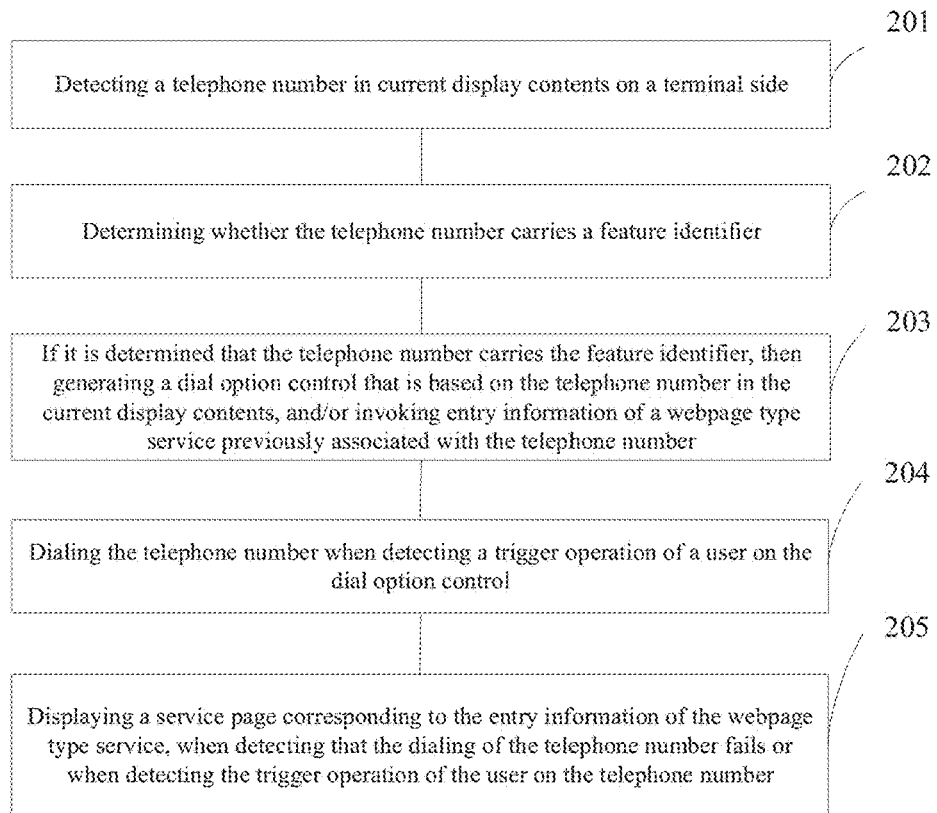
FIG. 2 schematically illustrates a process flow chart of a second example of a telephone number based information loading method according to one embodiment of the present invention.

With reference to FIG. 2, it shows a process flow chart of a second example of a telephone number based information loading method according to one embodiment of the present invention, particularly comprising steps as below.

Step 201, detecting a telephone number in current display contents on a terminal side.

In this embodiment of the present invention, the terminal may be a mobile terminal. In a preferred example, the current display contents may include at least one of contents of a page opened by a browser and a current session interface (for example, a current session interface of social networking application).

In one implementation, the telephone number may be detected based on page codes of the current display contents. In particular, the telephone number can be specially processed by means of source codes of page contents displayed in an application of mobile device (such as a browser application). For example, a label of "wtai:/wp/mc" is used to make identification in front of the telephone number, wherein wtai (Wireless Telephony Applications Interface) is a function dedicatedly for making a telephone call in WML (Wireless Markup Language). As an example, the source codes of a processed telephone number can be: <ahref="wtai://wp/mc:13800138000">13800138000</a>. When the label of "wtai://wp/mc" is detected in page codes corresponding to the current display contents, the telephone number can be identified based on this label.

It is to be noted that other means may be used to detect the telephone number in the current display contents. For example, the telephone number is detected based on an user's selection operation of the telephone number. This will not be restricted by the embodiments of the present invention.

Step 202, determining whether the telephone number carries a feature identifier.

After the telephone number is identified in the current display contents, it will be further determined whether or not the telephone number carries the feature identifier. In a preferred embodiment of the present invention, Step 202 may comprise following Sub-Steps:

Sub-Step S11, matching the telephone number in a local database, wherein if the matching is successful, then proceed to Sub-Step S12, or otherwise proceed to Sub-Step S13;

In order to speed up search efficiency, reduce search pressure of a server, and reduce the number of client-server interaction to save network resources, in the embodiment of the present invention, after the browser detects the telephone number, the telephone number can be firstly matched in the local database of the terminal. Herein the local database can be a local address book of an address book application installed in the terminal, in which one or more telephone numbers carrying the feature identifiers are stored.

Sub-Step S12, determining that the telephone number carries the feature identifier.

If the matching with the telephone number is completed in the local address book, then it can be determined that the telephone number carries the feature identifier. As a preferred example of this embodiment of the present invention, the feature identifier may be a promotional identifier for a merchant. For example, the merchant's telephone number carrying the promotional identifier stored in the local address book could be represented as follows: 12345 (store), wherein (store) is the promotional identifier and 12345 is the telephone number.

Sub-Step S13, generating a query request in accordance with the telephone number; and Sub-Step S14, sending the query request to a server, and receiving a response message returned from the server representing that the telephone number carries the feature identifier, wherein the response message is generated when the server searches the database on a server side for the telephone number in accordance with the query request and when the telephone number is found.

If there is no matching with the telephone number in the local address book, then according to the embodiment of the present invention, a query request can be generated based on the detected telephone number and sent to a server corresponding to the current client. After the server receives the query request, the matching of telephone number can be made in the database on the server side. If the matching with the telephone number is completed by the server in the database of the server, then it can be determined that the telephone number is a telephone number carrying a feature identifier. At this point, the server can generate a response message representing that the telephone number carries a feature identifier and return the response message to the browser. After the browser receives the response message, it can be determined that the telephone number carries the feature identifier. Herein, the current client can be an address book application, the server can be a server corresponding to the address book application, and the database of the server can be address book data of the server in which one or more telephone numbers carrying the feature identifiers are stored.

Of course, according to this embodiment of the present invention, Sub-Step S13 may also be directly executed without going through the local matching process of Sub-Step S11 and Sub-Step S12. This will be not necessarily restricted by the embodiments of the present invention.

Step 203, if it is determined that the telephone number carries the feature identifier, then generating a dial option control that is based on the telephone number in the current display contents, and/or invoking entry information of a webpage type service previously associated with the telephone number.

In an application of this embodiment of the present invention, the local database and/or the database of the server currently used herein stores, in addition to the telephone numbers carrying the feature identifiers, the entry information and attribute information of the webpage type services previously associated with the telephone numbers. The attribute information may be a subject name (merchant name), address, etc., corresponding to the telephone number. If it is determined that the detected telephone number carries the feature identifier, the entry information and the attribute information of the previously associated webpage type service can be invoked from the database, and the attribute information can be displayed to inform the user of the subject name, the address, etc., corresponding to the telephone number.

As an example of this embodiment, the entry information may be a URL of the webpage type service. Herein, the webpage type service may be an on-line service for the processing of electronic commerce information for an entity corresponding to the telephone number. For example, if the entity corresponding to the telephone number is a merchant, the online service of the merchant may be a meal service, a ticket-booking service, and a telephone recharge service, etc.

In another embodiment, if it is determined that the detected telephone number carries the feature identifier, a dial option control that is based on the telephone number may be generated in accordance with the predefined control generation logic and displayed in the current display contents.

In a specific implementation, the dialing option control can be displayed in the form of the window FRAME or HOVER in a page of the current display contents.

Step 204, dialing the telephone number when detecting a trigger operation of a user on the dial option control.

Specifically, the trigger operation of a user on the dial option control may be a click action of the user. In one embodiment, a process of dialing the telephone number may be as follows: dialing by invoking an associated function to activate a dialing interface of a terminal in response to a click of the user on the dial option control.

In another embodiment, a process of dialing the telephone number may be as follows: when detecting a trigger operation of a user on the dial option control, a current application may generate a dial instruction and send the dial instruction a related server which initiates a voice call request based on the telephone number to a communication operator according to the dial instruction.

In the present invention, the telephone number can be dialed on the basis of above two modes. Of course, the embodiments of the present invention are not limited to the above-described two modes, and the telephone number can also be dialed by means of other modes. This is not necessarily restricted by the embodiments of the present invention.

Step 205, displaying a service page corresponding to the entry information of the webpage type service, when detecting that the dialing of the telephone number fails or when detecting the trigger operation of the user on the telephone number.

In a practical application, a scene where the dialing of the telephone number fails can be as follows: when the server does not receive a response message from the communication operator during a preset period of time, or when the server receives a response failure message returned from the communication operator, the server generates dial failure information and returns the dial failure information to the current application to inform the current application that the dialing of the telephone number has failed. After the current application receives the dial failure information, it can be determined that the dialing of the telephone number has failed. At this point, the current application can display the service page corresponding to the entry information of the webpage type service in the current interface.

Figure 3:
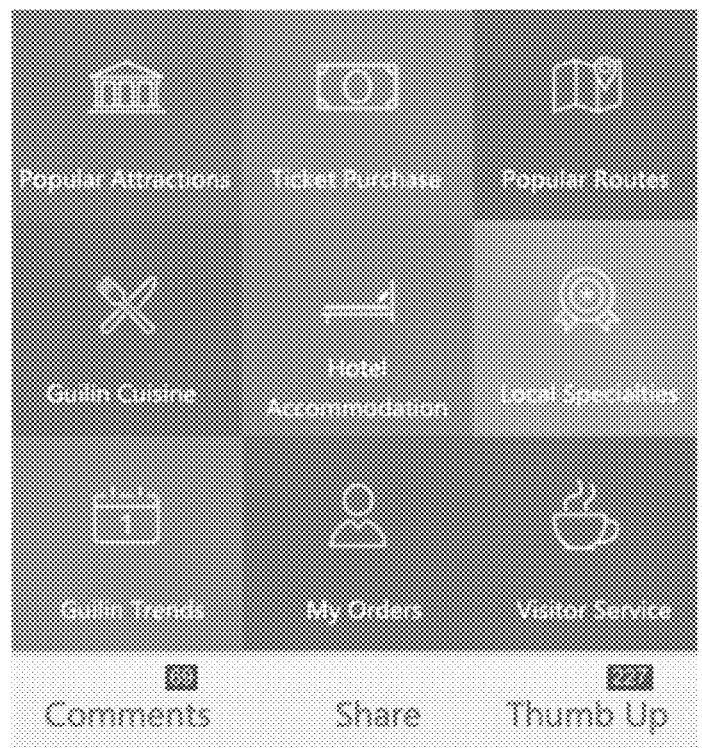
FIG. 3 schematically illustrates a service page diagram of the second example of a telephone number based information loading method according to one embodiment of the present invention.

In practice, the service page is a pre-customized page associated with business of the subject (such as the merchant) of the telephone number, which includes various types of business services, as shown in FIG. 3. The service page in FIG. 3 is a service page for scenery spot which may include a number of services such as popular attractions, ticket purchase, popular routes, food, hotel accommodation, local specialties, trends, my orders and visitor service. When the user enters the service page, an item related to a service can be selected.

It should be noted that, in order to improve the user experience and to avoid expending webpage resources due to refreshing the page for multiple times by the user, a service page associated with user's current location information can be shown first at the time of displaying the service page.

On the other hand, when the trigger operation of the user on the telephone number is detected (for example, the user clicks the telephone number in the displayed contents), the entry information of the webpage type service can also be triggered to show the related service page.

In a particular implementation, the telephone number carrying the feature identifier may be stored in the address book application after the telephone number is dialed. Specifically, in one embodiment, if the telephone number carrying the feature identifier does not exist in a local address book, then after the telephone number is dialed, a contact directory may be created in the local address book and the telephone number carrying the feature identifier may be stored in the created contact directory.

In practice, in addition to including the telephone number carrying the feature identifier, the created contact directory can include the entry information of the webpage type service associated with the telephone number and the subject name of the telephone number (for example, the merchant name).

After the telephone number is stored, the telephone number is considered as being noticed accordingly. In the embodiment of the present invention, a push message from the webpage type service corresponding to the telephone number or a push message from the telephone number may also be received. For example, the push message can be an advertisement information push.

It is to be noted that when receiving a trigger operation for the dial option control, the embodiment of the present invention is not limited to dialing the telephone number and may allow for other operations. For example, a message editing page can be displayed, and when a communication message input to the message editing page is detected, the communication message can be sent to the terminal device corresponding to the telephone number.

In the embodiment of the present invention, if the dialing of the telephone number by triggering the dial option control by the user fails, it is possible to display the service page corresponding to the entry information of the webpage type service associated with the telephone number so that the user can achieve the same purpose of dialing the phone number by selecting services online, providing user-friendly operations and improvement of the user experience.

The method embodiments, for the purpose of brief description, are described as a series of combined actions. However, it should be appreciated by those skilled in the art that the embodiments of the present invention should not be restricted by the sequence of the actions as set forth, since some of actions could be performed in different sequence or simultaneously according to the embodiments of the present invention. Moreover, it should also be appreciated by those skilled in the art that, the embodiments as described in the specification are preferred embodiments and actions and modules concerned are not necessarily required in the embodiments of the present invention.

Figure 4:
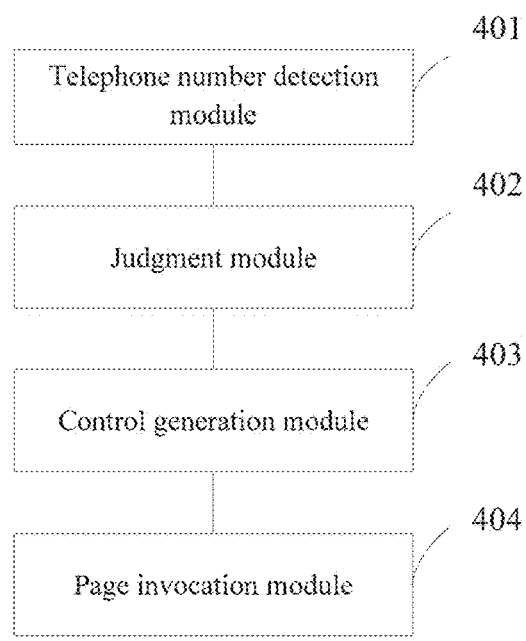
FIG. 4 schematically illustrates a structural block diagram of an example of a telephone number based information loading device according to one embodiment of the present invention.

With reference to FIG. 4, it illustrates a structural block diagram of an example of a telephone number based information loading device according to one embodiment of the present invention, which may comprise following modules:

a telephone number detection module 401, configured to detect a telephone number in current display contents on a terminal side;

a determining module 402, configured to determine whether the telephone number carries a feature identifier;

a control generation module 403, configured to, if it is determined that the telephone number carries the feature identifier, then generate a dial option control that is based on the telephone number in the current display contents; and a page invocation module 404, configured to, if it is determined that the telephone number carries the feature identifier, then invoke entry information of a webpage type service previously associated with the telephone number.

In a preferred example according to an embodiment of the present invention, the device may further comprise:

a telephone number dial module, configured to dial the telephone number when detecting a trigger operation of a user on the dial option control.

In a preferred example according to an embodiment of the present invention, the device can further comprise:

a page opening module, configured to display a service page corresponding to the entry information of the webpage type service when detecting that the dialing of the telephone number fails.

In a preferred example according to an embodiment of the present invention, the device may further comprise:

a page display module, configured to display a service page corresponding to the entry information of the webpage type service when detecting the trigger operation of the user on the telephone number.

As a preferred example of this embodiment of the present invention, the feature identifier may be a promotional identifier for a merchant.

As a preferred example of this embodiment of the present invention, the current display contents may include at least one of contents of a page opened by a browser and a current session interface.

In a preferred example according to an embodiment of the present invention, the determining module 402 is further configured to:

match the telephone number in a local database where one or more telephone numbers carrying the feature identifiers are stored; and if the matching is successful, then determine that the telephone number carries the feature identifier.

In a preferred example according to an embodiment of the present invention, the determining module 402 is further configured to:

if no telephone number in the local database that matches with the telephone number exists, then generate a query request in accordance with the telephone number; and send the query request to a server, and receive a response message returned from the server representing that the telephone number carries the feature identifier, wherein the response message is generated when the server searches the database on a server side for the telephone number in accordance with the query request and when the telephone number is found.

For the device embodiment of FIG. 4, since it is substantially similar to the above-described method embodiment, the description is relatively simple and reference can be made to the partial description of the method embodiment.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the components in the telephone number based information loading device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the Internet websites, or be provided in carrier, or be provided in other manners.

Figure 5:
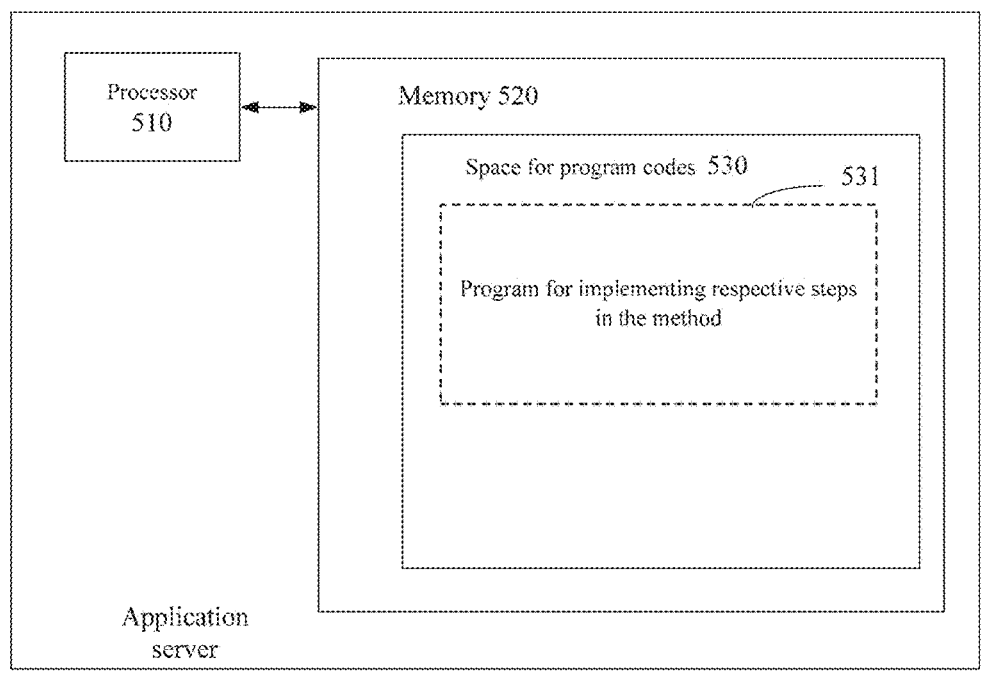
FIG. 5 schematically illustrates a block diagram of an electronic device for executing the method according to the present invention.
Figure 6:
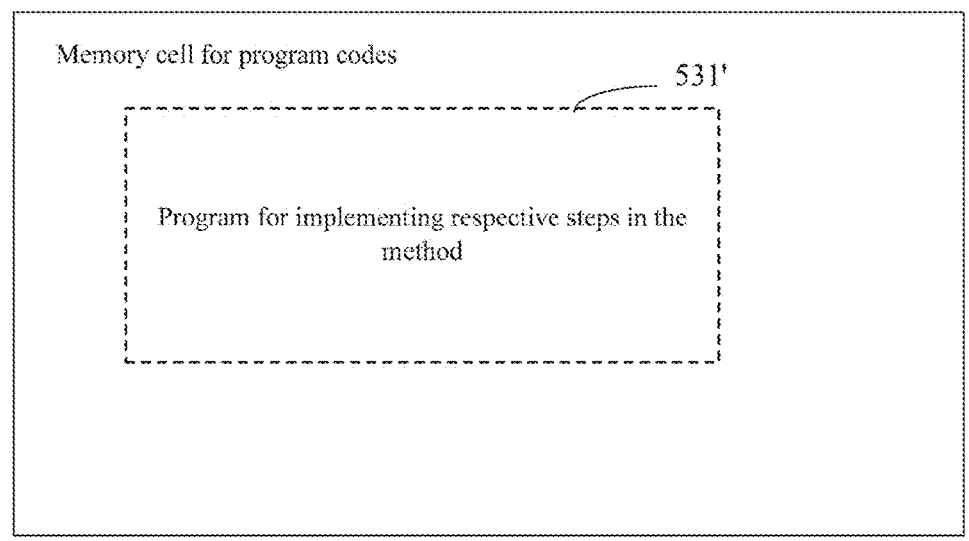
FIG. 6 schematically illustrates a storage unit for holding or carrying program codes for implementing the method according to the present invention.

For example, FIG. 5 illustrates an electronic device which can implement the telephone number based information loading according to the present invention, for example an application server. Traditionally, the server includes a processor 510 and a computer program product or a computer readable medium in form of a memory 520. The memory 520 could be electronic memories such as flash memory, EEPROM (Electrically Erasable Programmable Read-Only Memory), EPROM, hard disk or ROM. The memory 520 has a memory space 530 for executing program codes 531 of any steps in the above methods. For example, the memory space 530 for program codes may include respective program codes 531 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 520 of the communication device as shown in FIG. 5. The program codes may be compressed for example in an appropriate form. Usually, the memory cell includes a program 531' for executing the method steps according to the present invention, which could be codes readable for example by processors 510. When these codes are operated on the server, the server can execute respective steps in the method as described above.

Reference herein to "one embodiment", "an embodiment" or "one or more embodiments" means that a particular feature, structure, or characteristic described in connection with embodiments are included in at least one embodiment of the present invention. Also, it should be noted that the wordings herein "in one embodiment" are not necessarily all referred to the same embodiment.

A number of specific details are set forth in the specification provided herein. However, it will be appreciated that embodiments of the present invention may be practiced without these specific details. In some instances, well-known methods, structures, and techniques have not been shown in detail so as not to obscure the understanding of this specification.

It should be noted that the above-described embodiments are intended to illustrate but not to limit the present invention, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The present invention may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

In addition, it should also be noted that the language used in this specification is chosen primarily for the purpose of readability and teaching, and is not intended to be used for the purpose of explaining or defining the subject matter of the present invention. Accordingly, many modifications and variations will be apparent to those of ordinary skill in the art without departing from the scope and spirit of the appended claims. The scope of the invention is intended to be illustrative and not restrictive, and the scope of the invention is defined by the appended claims.

What is claimed is:

1. A method of loading information based on telephone number, comprising:
    detecting a telephone number in current display contents on a terminal side;
    determining whether the telephone number carries a feature identifier, wherein the determining whether the telephone number carries a feature identifier further comprises:
    matching the telephone number in a local database where one or more telephone numbers carrying feature identifiers are stored,
    determining that the telephone number carries the feature identifier when the matching is successful,
    when no telephone number in the local database that matches the telephone number exists, generating a query request in accordance with the telephone number, and
    sending the query request to a server, and receiving a response message returned from the server representing that the telephone number carries the feature identifier, wherein the response message is generated when the server searches a database on a server side for the telephone number in accordance with the query request and when the telephone number is found; and
    in response to a determination that the telephone number carries the feature identifier, generating a dial option control that is based on the telephone number in the current display contents or invoking entry information of a webpage type service previously associated with the telephone number.

2. The method according to claim 1, further comprising:
    dialing the telephone number when detecting a trigger operation of a user on the dial option control.

3. The method according to claim 2, further comprising:
    displaying a service page corresponding to the entry information of the webpage type service, when detecting that the dialing of the telephone number fails.

4. The method according to claim 1, further comprising:
    displaying a service page corresponding to the entry information of the webpage type service, when detecting the trigger operation of the user on the telephone number.

5. The method according to claim 1, wherein the feature identifier is a promotional identifier for a merchant.

6. The method according to claim 1, wherein the current display contents include at least one of contents of a page opened by a browser and a current session interface.

7. A device, comprising:
    a memory having instructions stored thereon;
    a processor configured to execute the instructions to perform operations, the operations comprising:
    detecting a telephone number in current display contents on a terminal side;
    determining whether the telephone number carries a feature identifier, wherein the operation of determining whether the telephone number carries a feature identifier further comprises:
    matching the telephone number in a local database where one or more telephone numbers carrying feature identifiers are stored,
    when the matching is successful, determining that the telephone number carries the feature identifier,
    when no telephone number in the local database that matches the telephone number exists, generating a query request in accordance with the telephone number, and
    sending the query request to a server, and receiving a response message returned from the server representing that the telephone number carries the feature identifier, wherein the response message is generated when the server searches a database on a server side for the telephone number in accordance with the query request and when the telephone number is found;
    when it is determined that the telephone number carries the feature identifier, generating a dial option control that is based on the telephone number in the current display contents; and
    when it is determined that the telephone number carries the feature identifier, invoking entry information of a webpage type service previously associated with the telephone number.

8. The device according to claim 7, wherein the operations further comprise:
    dialing the telephone number when detecting a trigger operation of a user on the dial option control.

9. The device according to claim 8, wherein the operations further comprise:
    displaying a service page corresponding to the entry information of the webpage type service when detecting that the dialing of the telephone number fails.

10. The device according to claim 7, wherein the operations further comprise:
    displaying a service page corresponding to the entry information of the webpage type service when detecting the trigger operation of the user on the telephone number.

11. The device according to claim 7, wherein the feature identifier is a promotional identifier for a merchant.

12. The device according to claim 7, wherein the current display contents include at least one of contents of a page opened by a browser and a current session interface.

13. A non-transitory computer readable medium having computer programs stored thereon that, when executed by one or more processors of an application server, cause the application server to perform operations, the operations comprising:
    detecting a telephone number in current display contents on a terminal side;
    determining whether the telephone number carries a feature identifier, wherein the operation of determining whether the telephone number carries a feature identifier further comprises:

matching the telephone number in a local database where one or more telephone numbers carrying feature identifiers are stored, determining that the telephone number carries the feature identifier when the matching is successful, generating a query request in accordance with the telephone number when no telephone number in the local database matches the telephone number, sending the query request to a server, and receiving a response message returned from the server representing that the telephone number carries the feature identifier, wherein the response message is generated when the server searches a database on a server side for the telephone number in accordance with the query request and when the telephone number is found; and in response to a determination that the telephone number carries the feature identifier, generating a dial option control that is based on the telephone number in the current display contents, or invoking entry information of a webpage type service previously associated with the telephone number.

14. The non-transitory computer readable medium according to claim 13, wherein the operations further comprise:

dialing the telephone number when detecting a trigger operation of a user on the dial option control.

15. The non-transitory computer readable medium according to claim 13, wherein the operations further comprise:

displaying a service page corresponding to the entry information of the webpage type service, when detecting the trigger operation of the user on the telephone number.

* * * * *